(12) United States Patent
McKee

(10) Patent No.: US 7,937,704 B2
(45) Date of Patent: May 3, 2011

(54) DISTRIBUTED COMPUTER

(75) Inventor: Paul F McKee, Colchester (GB)

(73) Assignee: British Telecommunications public limited company, London (GB)

( * ) Notice: Subject to any disclaimer, the term of this patent is extended or adjusted under 35 U.S.C. 154(b) by 1467 days.

(21) Appl. No.: 10/517,434

(22) PCT Filed: Jun. 19, 2003

(86) PCT No.: PCT/GB03/02631
§ 371 (c)(1),
(2), (4) Date: Dec. 10, 2004

(87) PCT Pub. No.: WO04/001598
PCT Pub. Date: Dec. 31, 2003

(65) Prior Publication Data
US 2005/0257220 A1 Nov. 17, 2005

(30) Foreign Application Priority Data
Jun. 20, 2002 (EP) .................................. 02254294

(51) Int. Cl.
*G06F 9/46* (2006.01)
*G06F 15/16* (2006.01)
(52) U.S. Cl. .................. 718/102; 718/104; 709/227
(58) Field of Classification Search .............. 718/104, 718/100, 102; 709/201, 221, 223–226, 227, 709/229
See application file for complete search history.

(56) References Cited

U.S. PATENT DOCUMENTS

| 5,423,037 A | 6/1995 | Hvasshovd |
| 5,442,791 A | 8/1995 | Wrabetz |
| 5,732,397 A | 3/1998 | Detore |
| 5,745,687 A * | 4/1998 | Randell ......................... 709/201 |
| 5,774,668 A * | 6/1998 | Choquier et al. ............. 709/223 |
| 5,790,848 A | 8/1998 | Wlaschin |
| 5,829,023 A | 10/1998 | Bishop |

(Continued)

FOREIGN PATENT DOCUMENTS

EP 0 481 231 9/1991

(Continued)

OTHER PUBLICATIONS

Dennis Geels and John Kubiatowicz, "OIL: the OceanStore Introspection Layer." Jan. 2002. ://oceanstore.cs.berkeley.ed:_~.publications/talks/tahoe-2002-01/oil.pdf.*

(Continued)

*Primary Examiner* — Meng-Ai An
*Assistant Examiner* — Caroline Arcos
(74) *Attorney, Agent, or Firm* — Nixon & Vanderhye P.C.

(57) ABSTRACT

A distributed computing network is disclosed, the membership of which is determined in accordance with policy data stored at existing member nodes. A node wishing to join the distributed computing network sends profile data indicating the resources it has available for shared computation to a member node. The member node compares the resources with the requirement indicated in the priority data. If the comparison indicates that the applicant node should join, then data indicating the topology of the distributed computing network is updated at the member node and created at the applicant node. This allows for the creation of a distributed computing network whose topology is well-suited to a given task, provided the policy properly reflects the requirements of the task.

22 Claims, 12 Drawing Sheets

U.S. PATENT DOCUMENTS

| | | | |
|---|---|---|---|
| 5,881,231 A | 3/1999 | Takagi et al. | |
| 5,978,791 A | 11/1999 | Farber | |
| 6,128,590 A | 10/2000 | Stadel et al. | |
| 6,249,844 B1 | 6/2001 | Schloss | |
| 6,272,612 B1 | 8/2001 | Bordaz | |
| 6,330,621 B1 | 12/2001 | Bakke et al. | |
| 6,336,177 B1 | 1/2002 | Stevens | |
| 6,353,608 B1* | 3/2002 | Cullers et al. | 370/352 |
| 6,393,485 B1* | 5/2002 | Chao et al. | 709/231 |
| 6,405,284 B1 | 6/2002 | Bridge | |
| 6,438,705 B1* | 8/2002 | Chao et al. | 714/4 |
| 6,463,457 B1* | 10/2002 | Armentrout et al. | 709/201 |
| 6,505,283 B1 | 1/2003 | Stoney | |
| 6,605,286 B2 | 8/2003 | Steidler | |
| 6,622,221 B1 | 9/2003 | Zahavi | |
| 6,631,449 B1 | 10/2003 | Borrill | |
| 6,662,235 B1 | 12/2003 | Callis et al. | |
| 6,801,949 B1 | 10/2004 | Bruck et al. | |
| 6,871,219 B2 | 3/2005 | Noordergraaf | |
| 6,898,634 B2 | 5/2005 | Collins | |
| 6,961,539 B2 | 11/2005 | Schweinhart et al. | |
| 7,062,556 B1* | 6/2006 | Chen et al. | 709/226 |
| 7,069,295 B2 | 6/2006 | Sutherland et al. | |
| 7,127,606 B2 | 10/2006 | Wheeler et al. | |
| 7,152,077 B2 | 12/2006 | Veitch et al. | |
| 7,296,221 B1 | 11/2007 | Treibach-Heck et al. | |
| 7,434,257 B2 | 10/2008 | Garg et al. | |
| 7,610,333 B2 | 10/2009 | Robertson et al. | |
| 2001/0034709 A1 | 10/2001 | Stoifo et al. | |
| 2001/0034791 A1 | 10/2001 | Clubb et al. | |
| 2002/0002577 A1* | 1/2002 | Garg et al. | 709/104 |
| 2002/0091833 A1* | 7/2002 | Grimm et al. | 709/227 |
| 2002/0099815 A1 | 7/2002 | Chatterjee et al. | |
| 2002/0114341 A1 | 8/2002 | Sutherland et al. | |
| 2002/0129248 A1 | 9/2002 | Wheeler et al. | |
| 2002/0133681 A1 | 9/2002 | McBrearty et al. | |
| 2002/0138471 A1 | 9/2002 | Dutta et al. | |
| 2002/0138659 A1* | 9/2002 | Trabaris et al. | 709/313 |
| 2002/0156893 A1 | 10/2002 | Pouyoul et al. | |
| 2002/0184310 A1* | 12/2002 | Traversat et al. | 709/204 |
| 2003/0032391 A1 | 2/2003 | Schweinhart et al. | |
| 2003/0046270 A1 | 3/2003 | Leung et al. | |
| 2003/0061491 A1 | 3/2003 | Jaskiewicz et al. | |
| 2003/0115251 A1 | 6/2003 | Fredrickson et al. | |
| 2003/0163457 A1 | 8/2003 | Yano et al. | |
| 2003/0204856 A1 | 10/2003 | Buxton | |
| 2004/0054807 A1 | 3/2004 | Harvey et al. | |
| 2004/0064568 A1 | 4/2004 | Arora et al. | |
| 2005/0022014 A1 | 1/2005 | Shipman | |
| 2005/0050291 A1 | 3/2005 | Chen et al. | |
| 2005/0257220 A1 | 11/2005 | McKee | |
| 2006/0117046 A1 | 6/2006 | Robertson et al. | |
| 2006/0149836 A1 | 7/2006 | Robertson et al. | |
| 2008/0059746 A1 | 3/2008 | Fisher | |

FOREIGN PATENT DOCUMENTS

| | | |
|---|---|---|
| EP | 0 515 073 | 11/1992 |
| EP | 0 750 256 | 6/1996 |
| EP | 0 887 731 | 6/1998 |
| EP | 1248441 | 10/2002 |
| JP | 2002-027375 A | 1/2002 |
| WO | 96/30839 | 10/1996 |
| WO | WO98/09402 * | 3/1998 |
| WO | 99/44334 | 9/1999 |
| WO | 01/82678 | 11/2001 |
| WO | 02/29551 A3 | 4/2002 |
| WO | 03/069480 A1 | 8/2003 |
| WO | 04/001598 A2 | 12/2003 |
| WO | 2005/121965 | 12/2005 |

OTHER PUBLICATIONS

Office Action in U.S. Appl. No. 10/541,061 mailed Oct. 15, 2008.
Office Action in U.S. Appl. No. 10/539,413 mailed Apr. 1, 2008.
Office Action in U.S. Appl. No. 10/539,413 mailed Sep. 18, 2007.
Sean Rhea, Chris Wells, Patrick Eaton, Dennis Geels, Ben Zhao, Hakim Weatherspoon, and John Kubiatowicz, "Maintenance-Free Global Data Storage," Sep., Oct. 2001, IEEE Internet Computing, http://computer.org/internet/, 1089-7801/01.
Robertson, et al., "Persistent, Reliable, Decentralised File System—DFS," XP-002302658, 4 pages, Sep. 2002.
Devarakonda, et al., "A Policy-Based Storage Management Framework," *IEEE Proceedings of the Third International Workshop on Policies for Distributed Systems and Networks (POLICY'02)*, 4 pages, Apr. 2002.
Devarakonda, et al., "A Toolkit-Based Approach to Policy-Managed Storage," pp. 89-92, Apr. 2003.
Marrow, et al., "Agents in Decentralised Information Ecosystems: The DIET Approach," 9 pages.
Hoile, et al., "Core Specification and Experiments in DIET: A Decentralised Ecosystem-inspired Mobile Agent System," *AAMAS'02*, pp. 623-630, Jul. 2002.
Rabin, "Efficient Dispersal of Information for Security, Load Balancing, and Fault Tolerance," *J. Assn. Comp. Mach.*, vol. 35, No. 2, pp. 335-348, Apr. 1989.
Verma, et al., "Policy based Management of Content Distribution Networks," pp. 1-7.
Fisher, et al., "Policy Based Management of Large Distributed Systems," 4 pages, Oct. 2001.
Prnjat, et al., "Policy-based Management for ALAN-Enabled Networks," 12 pages, Jun. 2002.
Carlson, et al., "Policy-based Storage Management," Storage Networking Industry Association (SNIA), pp. 1-10, Aug. 2000.
Weatherspoon, et al., "Silverback: A Global-Scale Archival System," XP-002302722, pp. 1-15, Mar. 2001.
Gelb, "System-managed storage," *IBM Systems Journal*, vol. 28, No. 1, pp. 77-103, 1989.
International Search Report dated Nov. 2, 2004, re PCT/GB03/05396.
UK Search Report dated Jun. 18, 2003, re GB 0230331.1.
Smithson, et al., "Engineering An Agent-Based Peer-to-Peer Resource Discovery System," Agents and Peer-to-Peer Computing, First International Workshop, AP2PC 2002, Revised and Invited Papers (Lecture Notes in Artificial Intelligence, vol. 2530), Springer-Verlag, Berlin, Germany, pp. 69-80, Jul. 2002.
Ramanathan, et al., "Finding Good Peers in Peer-to-Peer Networks," Parallel and Distributed Processing Symposium, Proceedings International, IPDPS 2002, Abstracts and CD-ROM, Ft. Lauderdale, FL, Apr. 2002, Los Alamitos, CA, IEEE Comp. Soc. 8US, pp. 232-239, Apr. 2002.
Rowstron, et al., "Storage Management and Caching in PAST, a Large-Scale, Persistent Peer-to-Peer Storage Utility," Operating Systems Review ACM, USA, vol. 35, No. 5, pp. 188-201, Oct. 2001.
Lim et al.: "Developing pattern-based management programs," CTR Technical Report 503-01-01, Aug. 6, 2001, pp. 1-19.
Plaszczak: "Hydra: Decentralized Distributed Computing Environment. System Design and Prototype Implementation," University of Mining and Metallurgy in Krakow, Poland, Jul. 2000, pp. 1-93.
U.S. Appl. No. 11/628,612, filed Dec. 6, 2006, Fisher.
Office Action mailed Jul. 2, 2009 in U.S. Appl. No. 11/628,612.
Office Action mailed Jun. 12, 2009 in U.S. Appl. No. 10/541,061.
Notice of Allowance mailed Jun. 16, 2009 in U.S. Appl. No. 10/539,413.
Office communication mailed Jun. 10, 2009 in U.S. Appl. No. 10/539,413.
Notice of Allowance mailed May 12, 2009 in U.S. Appl. No. 10/539,413.
Decision Granting Petition Under 37 CFR 1.313(c)(2) mailed Apr. 23, 2009 in U.S. Appl. No. 10/539,413.
Office communication mailed Feb. 23, 2009 in U.S. Appl. No. 10/539,413.
Notice of Drawing Inconsistency with Specification mailed Feb. 5, 2009 in U.S. Appl. No. 10/539,413.
Notice of Allowance mailed Dec. 31, 2008 in U.S. Appl. No. 10/539,413.
Office communication mailed Jul. 18, 2008 in U.S. Appl. No. 10/539,413.
Bindel, David et al., "OceanStore: An Extremely Wide-Area Storage System," Mar. 1999, U.C. Berkeley, Technical Report, UCB/CSD-00-1102.

Rhea, Sean et al., "Pond: the OceanStore Prototype," Mar. 2003, USENIX, FAST '03.

"Optimizing File Storage Performance with Adaptive Resource Networking," Acopia Networks, Inc., pp. 1-7, 2003.

Tang, et al., "Sorrento: A Self-Organizing Storage Cluster for Parallel Data-Intensive Application", UCSB Technical ReportID:2003-30, pp. 1-14, Oct. 2003.

Collins, et al., "A Network File Storage System", Los Alamos National Laboratory, pp. 99-101, 1982.

Foster, et al., "Renaissance: Managing the Network Computer and Its Storage Requirements", Epoch Systems, Inc., pp. 3-10, 1991.

McClain, "DataTree and UniTree: Software for File and Storage Management", Distributed Computing Solutions, pp. 126-128, 1990.

Thanhardt, et al., "File Migration in the Near Mass Storage System", National Center for Atmospheric Research, pp. 114-121, 1988.

Mecozzi, et al., "Design for a Transparent, Distributed File System", Lawrence Livermore National Laboratory, pp. 77-84, 1991.

Liu, et al., "An Effective File Migration Algorithm in Cluster File Systems", Department of Computer Science and Technology, pp. 329-335, 2000.

Chen, et al., "JVM for a Heterogeneous Shared Memory System", Computer Science Department, pp. 1-10, 2002.

Shu, et al., "Policy of File Migration at Server in Cluster File System", Computer Science and Technology Department, 8 pages, Apr. 2004.

"Adaptive Resource Networking", Acopia Networks—Adaptive Resource Networking, http://www.acopia.com/adaotive_networking/index.shtml, 3 pages, Feb. 12, 2004.

UK Search Report dated Oct. 15, 2004.

International Search Report dated Dec. 23, 2005.

Office Action mailed Mar. 1, 2010 in U.S. Appl. No. 11/628,612.

Office Action mailed Sep. 2, 2010 in U.S. Appl. No. 11/628,612.

Dennis Geels and John Kubiatowicz, "OIL: the OceanStore Introspection Layer." Jan. 2002. http://oceanstore.cs.berkeley.edu/publications/talks/tahoe-2002-01/oil.pdf.

* cited by examiner

Fig.3 (Cont i).
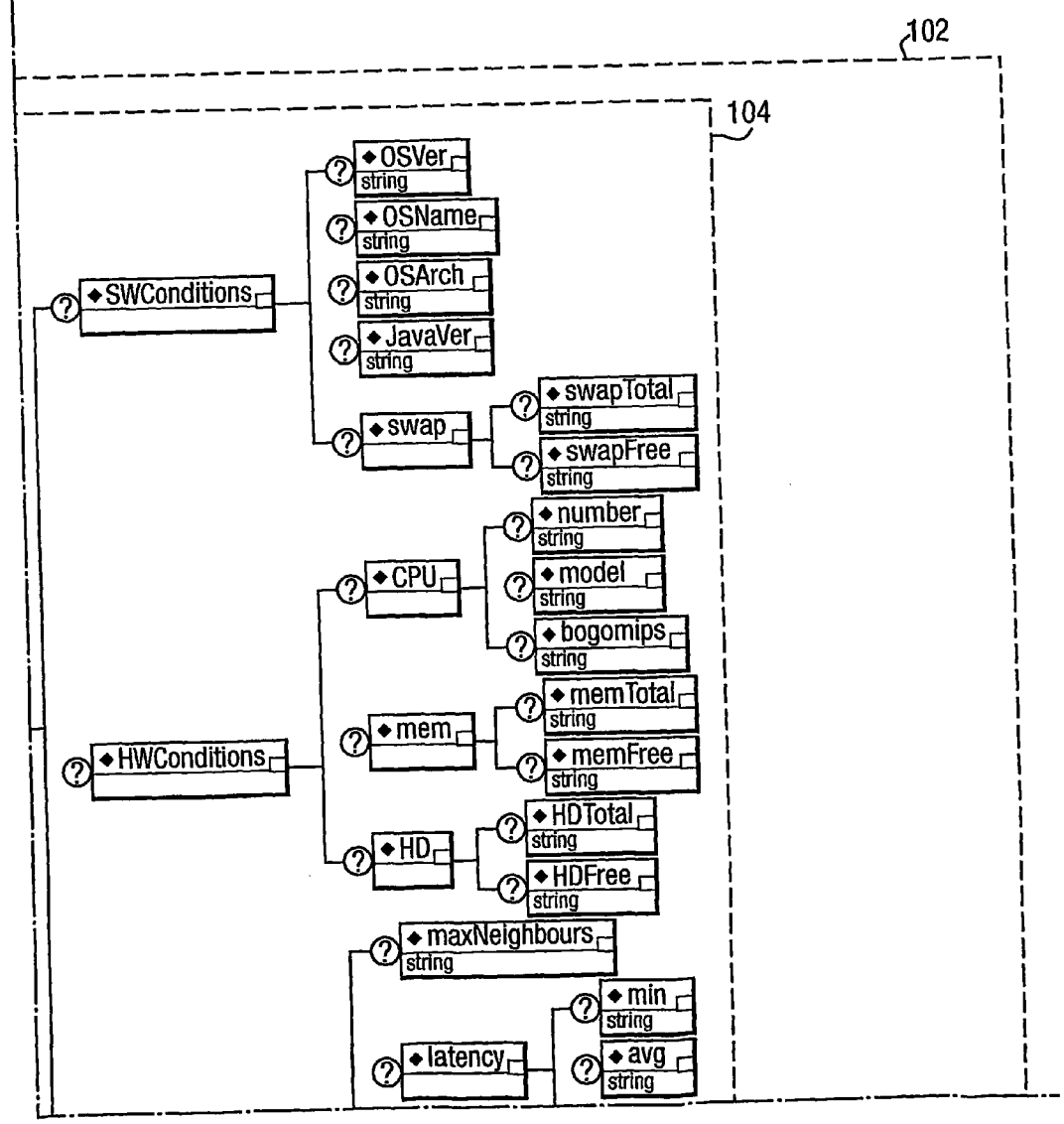

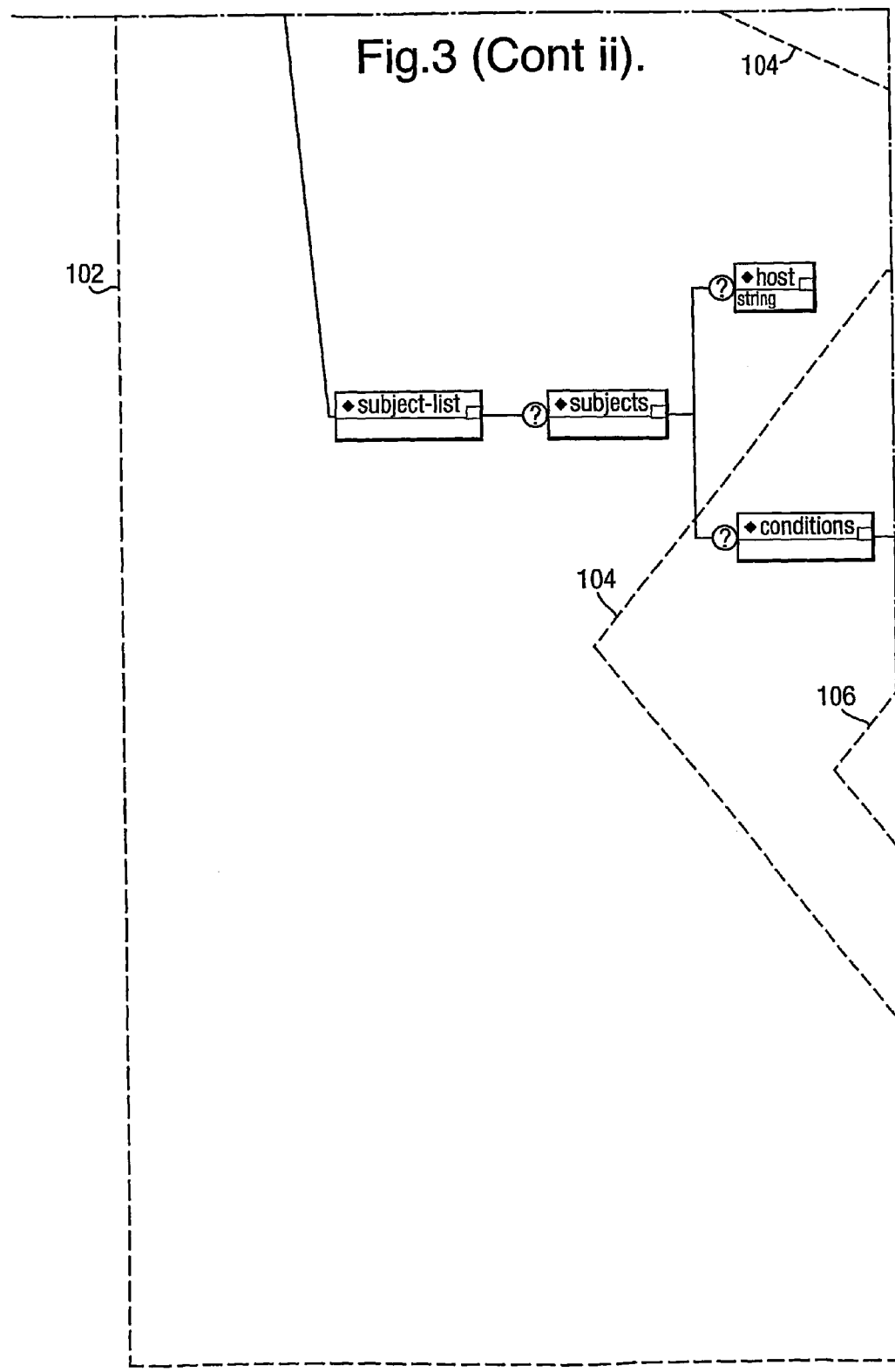

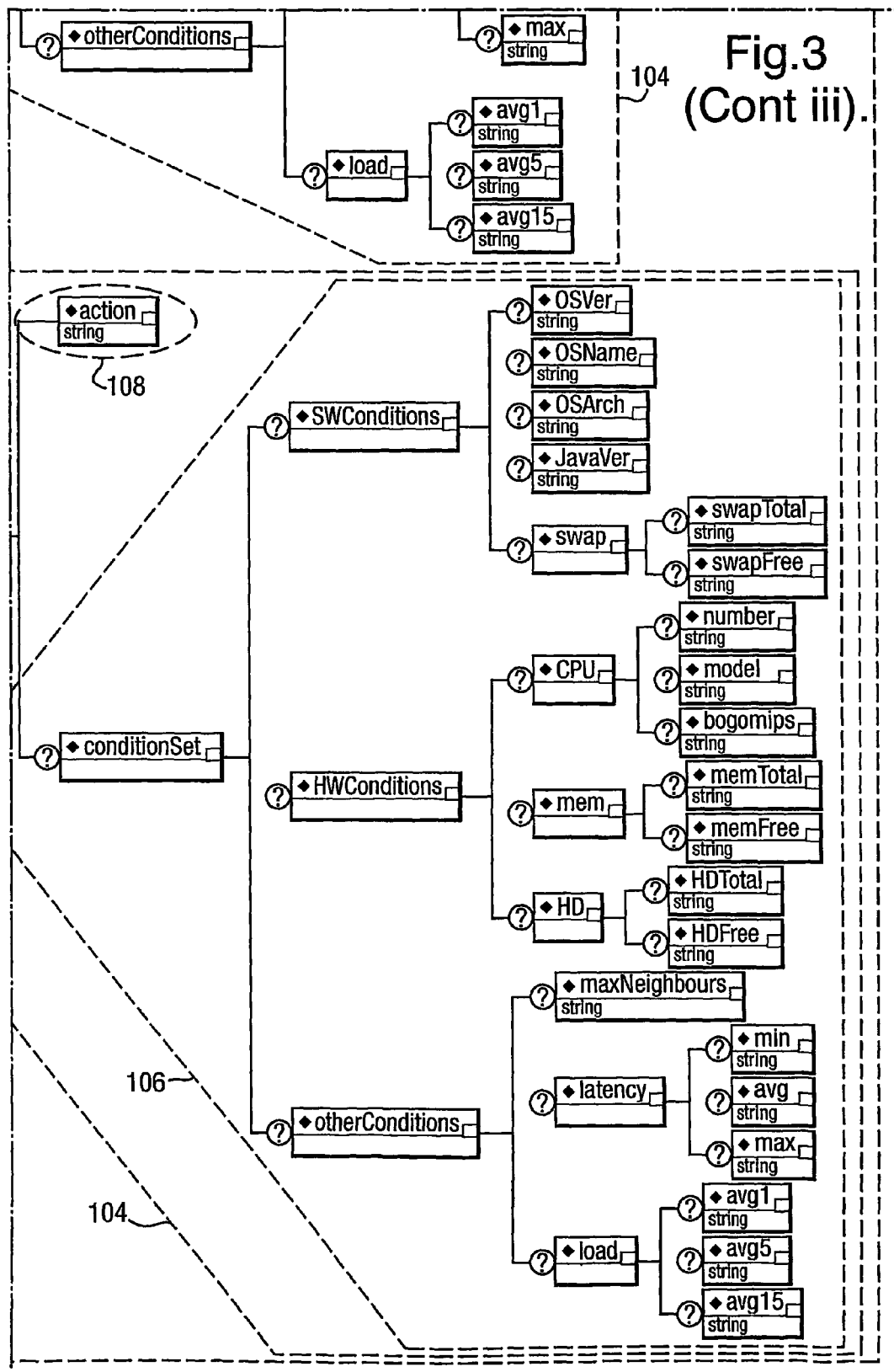
Fig.3 (Cont iii).

DISTRIBUTED COMPUTER

This application is the US national phase of international application PCT/GB2003/002631 filed 19 Jun. 2003 which designated the U.S. and claims benefit of EP 02254294.8, dated 20 Jun. 2002, the entire content of which is hereby incorporated by reference.

The present invention relates to a distributed computer and to a method of operating a computer forming a component of a distributed computer.

The relatively low cost of today's microprocessors mean that the most economic way of building a powerful computer is to interconnect a number of low cost microprocessors to provide a distributed computer. Although a purpose-built distributed computer will often be a unit of equipment comprising tens or hundreds of processors interconnected via a high-speed bus, the common arrangement of desktops PCs interconnected by an office LAN is also a form of distributed computer.

One application of a distributed computer is the carrying out of a task which is too demanding to be solved quickly by a computer having a single processor. In such a case, it is necessary to divide the task to be performed amongst the plurality of processors present in the distributed computer. This is known as processor allocation or 'load balancing'.

Distributed computers should also be tolerant to the failure or shutdown of one of the processors within them—systems of this type are disclosed, for example, in International Patent Application WO 01/82678, and European Patent applications 0 887 731 and 0 750 256.

A number of processor allocation or load balancing algorithms have been disclosed. In EAGER D. L., LAZOWSKA, E. D., and ZAHORJAN, J.: "Adaptive Load Sharing in Homogeneous Distributed Systems," IEEE Trans. On Software Engineering, vol. SE-12, pp. 662-675, May 1986, three algorithms are considered. One of those algorithms involves each processor creating a new process (i.e. contemplating starting another component of the task) in: a) finding whether it is overloaded, and, b) sending the new process to another randomly-chosen processor. The processor receiving the new process then carries out a similar procedure. This continues either until a processor accepts the new process or a hop-count is exceeded.

In other algorithms, one or more processors is given the task of tracking how heavily-loaded other processors in the distributed computer are. If the processors within the distributed computer are organised into a logical hierarchy independent of the physical structure of the network interconnecting the different processors, the task of monitoring levels of usage of the processors can be split-up in accordance with that hierarchy. An example of this is seen in WITTIE, L. D., and VAN TILBORG, A. M.: "MICROS, a Distributed Operating System for MICRONET, A Reconfigurable Network Computer," IEEE Trans. On Computers, vol. C-29, pp. 1133-1144, December 1980. New processes can be generated anywhere within the logical hierarchy and are escalated sufficiently far up the hierarchy to a 'manager' processor which has a sufficient number of subordinates to carry out the task. The manager then delegates the component tasks back down the hierarchy.

According to a first aspect of the present invention, there is provided a method of dividing a task amongst a plurality of nodes within a distributed computer, said method comprising:

receiving requirements data indicating desired properties of a task group of nodes and interconnections between them, which properties lead to said task group being suited to said task or tasks of a similar type;

calculating a task group topology in dependence upon said requirements data; and distributing said task amongst the plurality of nodes in accordance with the task group topology thus calculated.

By calculating task group topology data representing nodes and interconnections between them in dependence on requirements data entered by a user/administrator, and then distributing a task to be performed between nodes in accordance with the calculated topology, a more flexible method of utilising the resources of a distributed computer than has hitherto been known is provided. It is to be understood that the task group will not necessarily equate to the physical topology of the nodes and interconnections between them in the distributed computer. The nodes and connections used will often be a subset of those available—also a logical connection represented in the task group topology data might represent a concatenation of a plurality of physical connections.

Preferably, said topology calculation comprises the step of comparing said requirements data with node capability data for a node available to join said task group. This provides a convenient mechanism for automatically generating the task group topology.

Preferably, said requirements data is arranged in accordance with a predefined data structure defined by requirements format data stored in said computer, said method further comprising the step of verifying that said requirements data is formatted in accordance with predefined data structure by comparing said requirements data to said requirements format data. Defining the format of said requirements data in this way allows for easier communication of requirements data between computers. In preferred embodiments, the extensible Markup Language (XML) is used to define the format data, and known XML parsing programs are used to check the format of requirements data.

Similar considerations apply to the node capability data.

In some embodiments, said method further comprises the step of operating a node seeking to join said task group to generate node capability data and send said data to one or more nodes already included within said task group.

Advantageously, said task distribution involves a node forwarding a task to a node which neighbours it in said task group topology. This provides a convenient way of utilising the generated topology in the subsequent calculation.

According to a second aspect of the present invention, there is provided a distributed computer apparatus comprising:

a plurality of data processor nodes, each connected to at least one other of said data processor nodes via a communications link;

each of said nodes having recorded therein:

a) group membership policy data;
b) a list of group members;
c) processor readable code executable to update group membership data, said code comprising:

group membership request generation code executable to generate and send a group membership request including node profile data to another node indicated to be a member of said group;

group membership request handling code executable to receive a group membership request including node profile data, and decide whether said request is to be granted in dependence upon the group membership policy data stored at said node;

group membership update code executable to update the list of group members stored at said node on deciding to grant a group membership request received from another node, and to send a response to the node sending said request indicating that said request is successful.

Advantageously, each node further has recorded therein received program data execution code executable to receive program data from another of said nodes and to execute said program. Preferably, said plurality of processor nodes comprise computers executing different operating systems programs, and said received program execution code is further executable to provide a similar execution environment on nodes despite the differences in said operating system programs. This means that embodiments of the invention can carry out calculations across a heterogeneous computer network and increases the possibilities for utilising the processing power and memory of idle computers in a typical computer network comprising computers based on different hardware architectures and/or running different operating system programs.

According to a third aspect of the present invention, there is provided a method of operating a member node of a distributed computing network, said method comprising:
  accessing membership policy data comprising one or more property value pairs indicating one or more criteria for membership of said distributed computing network;
  receiving, from an applicant node, profile data comprising one or more property value pairs indicating characteristics of the applicant node;
  determining whether said applicant profile data indicates that said applicant node meets said membership criteria;
  responsive to said determination indicating that said applicant node meets said membership criteria, updating distributed computing network membership data accessible to said member node network to indicate that said applicant node is a member node of said distributed computing network.

By controlling a member node of a distributed computing network to compare profile data from another computer with criteria indicated by membership policy data accessible to the member node, and updating distributed computing network data accessible to the member node if said profile data indicates that said one or more criteria is met, a distributed network whose membership accords with said policy data is built up. Provided the policy reflects the distributed task that is to be shared amongst the members of the distributed computing network, a distributed computer network whose membership is suited to the distributed task to be shared is built up.

Preferably, the member node stores said distributed network membership data. This results in a distributing computing network which is more robust than networks where this data is stored in a central database. Similarly, in some embodiments, said member node stores said membership policy data.

In preferred embodiments, the method further comprises the steps of:
  updating said membership policy data;
  removing indications that one or more nodes are members of said distributed computing network from said distributed computing network membership data; and
  sending an indication to said one or more nodes requesting them to re-send said profile data.

This allows the distributed computing network to be dynamically reconfigured in response, for example, to a change in the task to be performed or the addition of a new type of node which might apply to become a member of the distributed computing network.

According to a fourth aspect of the present invention, there is provided a computer program product loadable into the internal memory of a digital computer comprising:
  task group requirements data reception code executable to receive and store received task group requirements data;
  node capability profile data reception code executable to receive and store received node capability profile data;
  comparison code executable to compare said node capability data and said task group requirements data to find whether the node represented by said node capability data meets said task group requirements;
  task group topology update code executable to add an identifier of said represented node to a task group topology data structure on said comparison code indicating that said represented node meets said requirements;
  task execution code executable to receive code from another node in said task group and to execute said code or forward said code to a node represented as a neighbour in said task group topology data structure.

By way of example only, specific embodiments of the present invention will now be described with reference to the accompanying Figures in which:

FIG. 5 is a flow-chart of a script (i.e. program) which is run by each of the computing devices of FIG. 1 when they are switched on;

Figure 1:
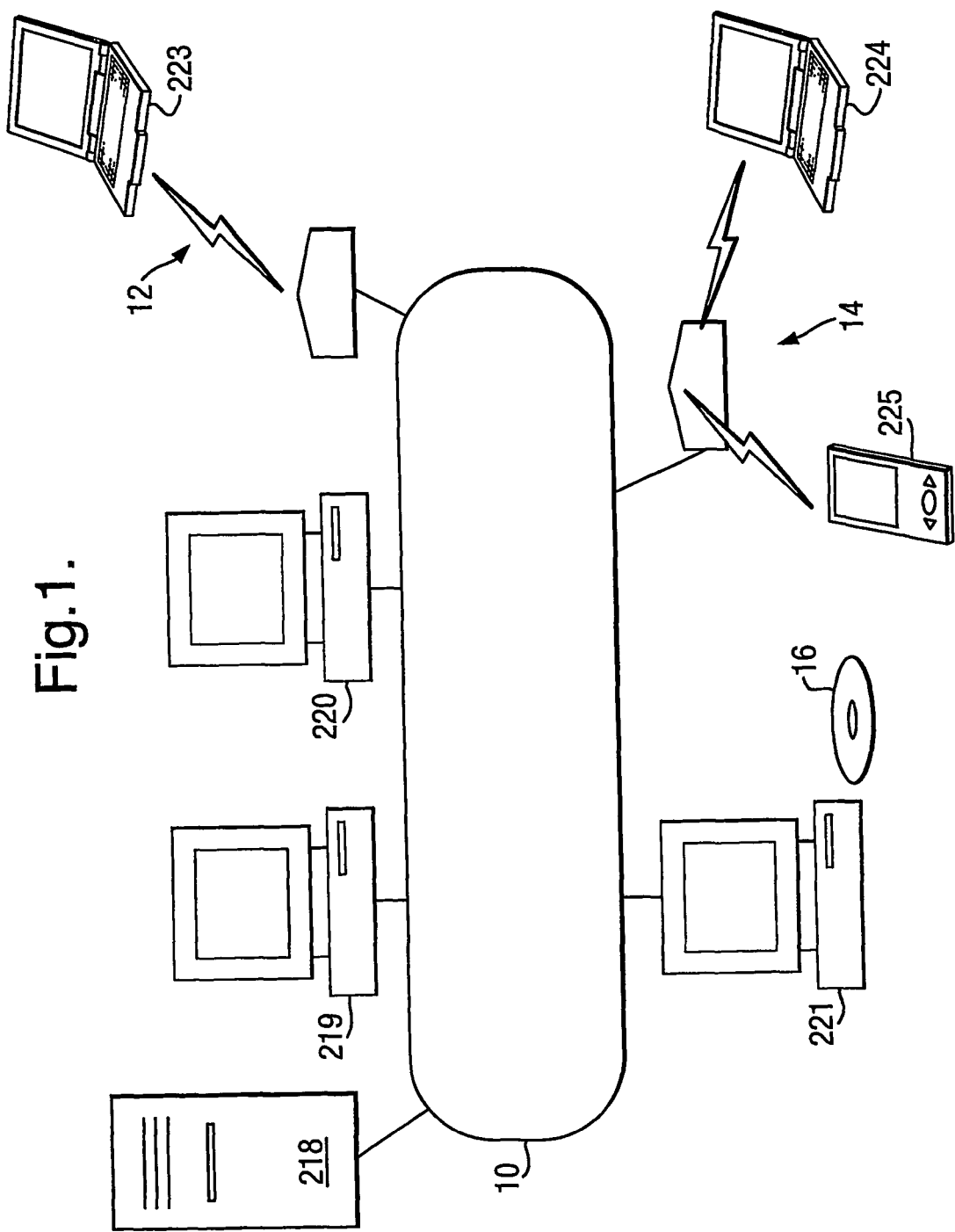
FIG. 1 shows an internetwork of computing devices operating in accordance with a first embodiment of the present invention.

FIG. 1 illustrates an internetwork comprising a fixed Ethernet 802.3 local area network 10 which interconnects first 12 and second 14 Ethernet 802.11 wireless local area networks. Attached to the fixed local area network 10 are a server computer 218, and three desktop PCs (219, 220, 221). The first wireless local area network 12 has a wireless connection to a first laptop computer 223, the second wireless local area network 14 has wireless connections to a second laptop computer 224 and a personal digital assistant 225.

Also illustrated is a compact disc which carries software which can be loaded directly or indirectly onto each of the computing devices of FIG. 1 (218-225) and which will cause them to operate in accordance with a first embodiment of the present invention when run.

Figure 2:
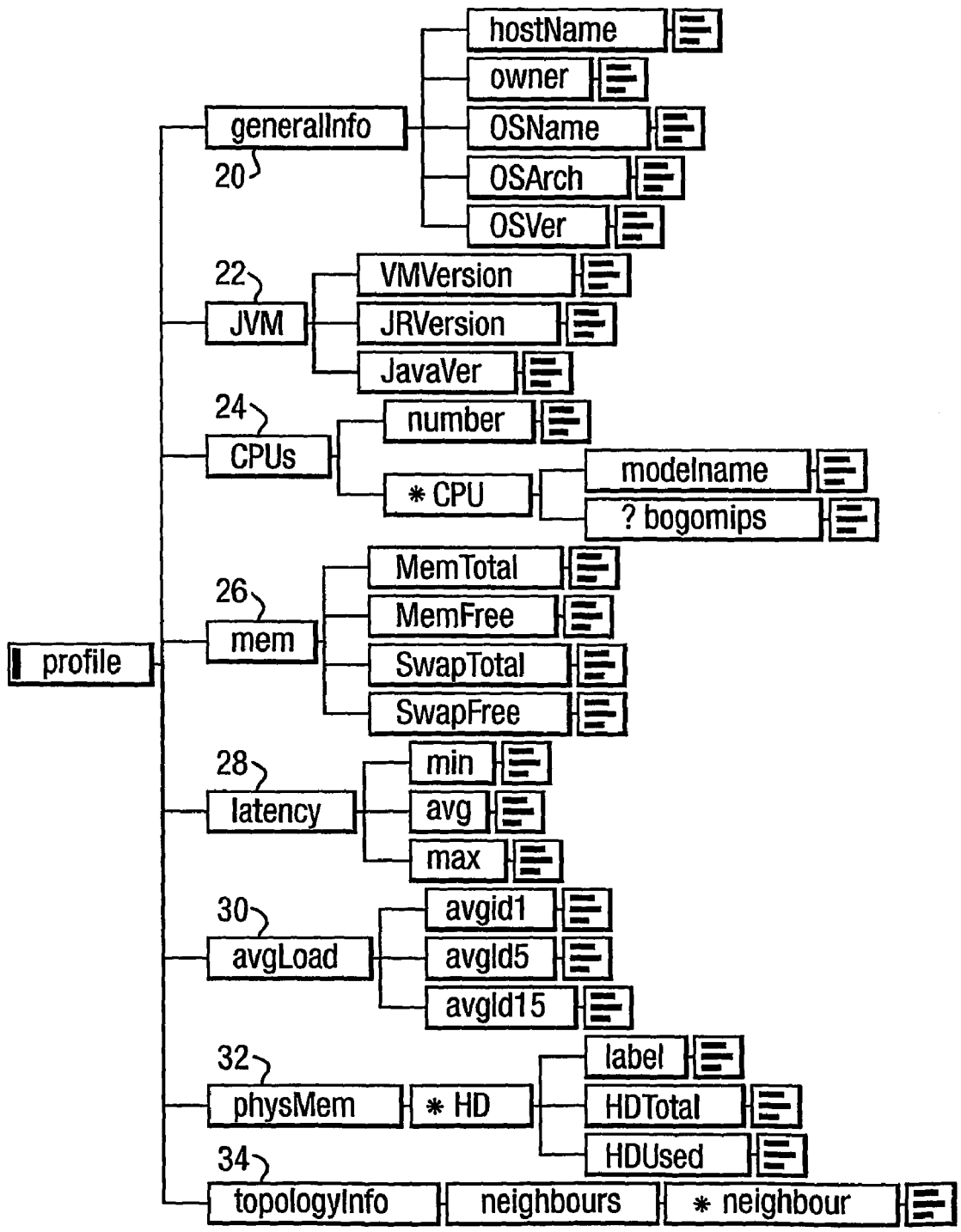
FIG. 2 shows a tree diagram representing a document type definition for a profile document for use in the first embodiment.

FIG. 2 shows, in tree diagram form, a Document Type Definition (DTD) which indicates a predetermined logical structure for a 'profile' document written in extensible Mark-Up Language (XML). The purpose of a 'profile' document is to provide an indication of the storage, processing and communication capabilities of a computing device.

As dictated by the DTD, a profile document consists of eight sections, some of which themselves contain one or more fields.

In the present embodiment, the eight sections relate to:
a) general information 20 about the computing device;
b) JVM information 22 about the Java Virtual Machine software installed on the device;
c) processor information 24 about the processor(s) contained within the device;
d) volatile memory information 26 about the volatile memory contained within the device;
e) link information 28 about the delay encountered by packets sent from the device to a neighbouring device;
f) utilisation information 30 about the amount of processing recently carried out by the processor(s) within the computing device;
g) permanent memory information 32 about the amount of permanent memory within the device; and
h) physical topology information 34—this comprises a list of Internet Protocol addresses for the immediate neighbours of the device. The physical topology information is input to the echo pattern information distribution scheme described below.

An example of an XML document created in accordance with the DTD shown in FIG. 2 is given below:

```
<!xml version='1.0'!>
<profile>
<!- - From the system properties - ->
<JVMVersion>1.4.0-beta2-b77</JVMVersion>
<JRVersion>1.4.0-beta2-b77</JRVersion>
<OSVer>2.4.12</OSVer>
<JavaVer>1.4.0-beta2</JavaVer>
<!- - From the 'cpuinfo' file - - >
<!- - infos about the cpu model and bogomips - ->
<modelname>PentiumIII (Coppermine) </modelname>
<bogomips>1723.59</bogomips>
<!- - From the 'meminfo' file - ->
<!- - infos about memory: amount of total and - ->
<!- - free physical mem (RAM and swap mem) - ->
<MemTotal>118460kB</MemTotal>
<MemFree>12188kB</MemFree>
<SwapTotal>96348kB</SwapTotal>
<SwapFree>87944kB</SwapFree>
<!- - From the 'ping' file - ->
<!- - infos about the min, max and avg throughput - ->
<min>0.044</min>
<avg>0.195</avg>
<max>0.647</max>
<mdev>0.261</mdev>
<!- - From the 'loadsvg' file - ->
<!- - infos about the average load - ->
<!- - of the last 1, 5 and 15 min - ->
<avgld1>0.02</avgld1>
<avgld5>0.03</avgld5>
<avgld15>0.00</avgld15>
<!- - From the 'df' file - ->
<!- - infos about the HD(s): name (mount point) - ->
<!- - total capacity and available space - ->
<HDName>dev</HDName>
<HDTotal>2440</HDTotal>
<HDUsed>1711</HDUSed>
<HDName>dev</HDName>
<HDTotal>16496</HDTotal>
<HDUsed>12007</HDUsed>
<topologyInfo>
<neighbours>
<neighbour> 196.168.255.10 </neighbour>
<neighbour> 196.268.255.128 </neighbour>
</neighbours>
</topologyInfo>
</proffile>
```

The fields specified in the Document Type Definition and the values placed in the above profile written in accordance with that DTD will be self-explanatory to those skilled in the art. The generation of a profile document in accordance with the above DTD will be described further on.

Figure 3:
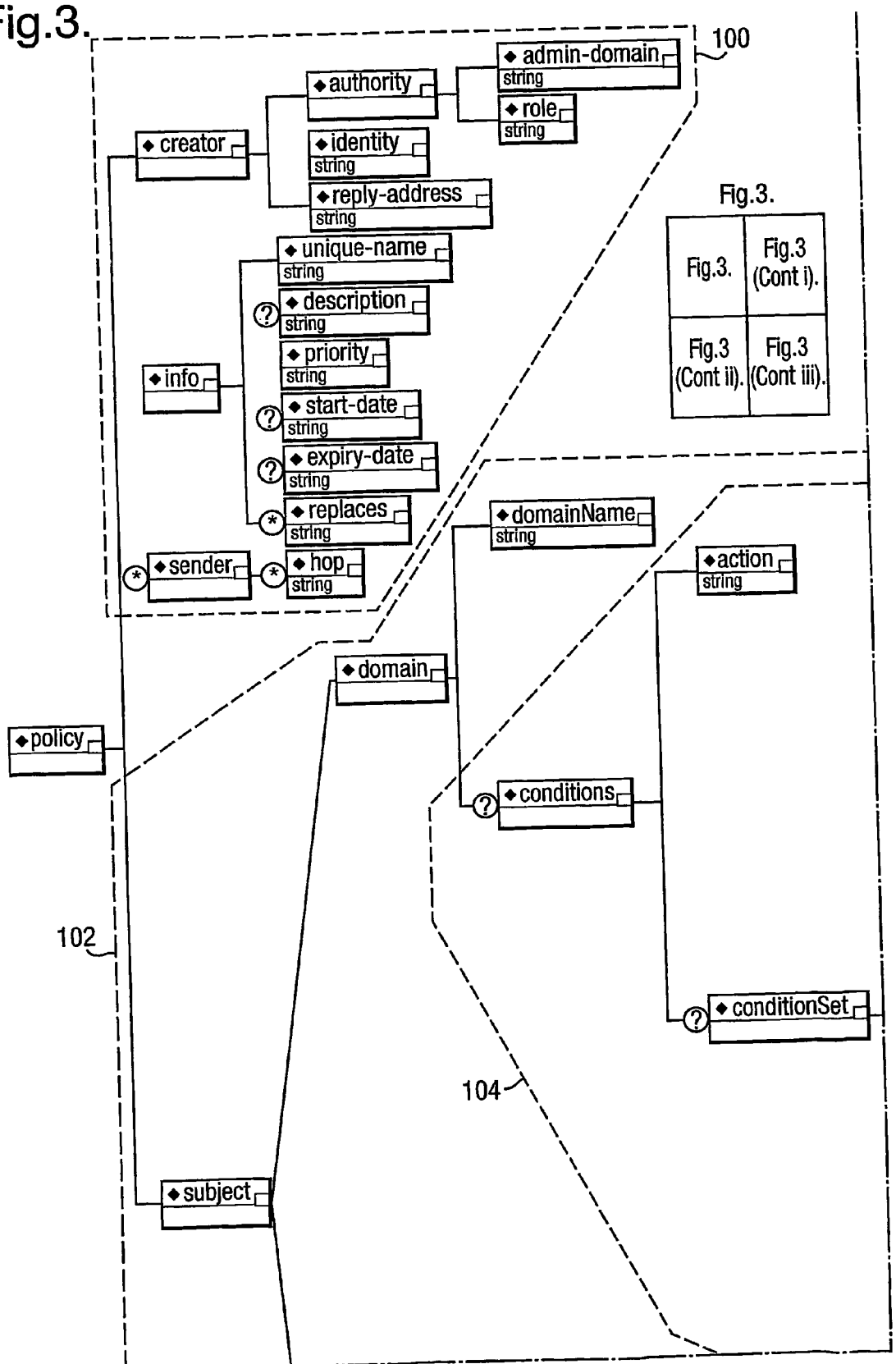
FIG. 3 shows a tree diagram representing a document type definition for a policy document for use in the first embodiment.

FIG. 3 shows, in tree diagram form, a Document Type Definition (DTD) which indicates a predetermined logical structure for a 'policy' document written in extensible Mark-Up Language (XML). One purpose of a 'policy' document in this embodiment is to set out the conditions which an applicant computing device must fulfil prior to a specified action being carried out in respect of that computing device. In the present case, the action concerned is the joining of the applicant computing device to a distributed computing network.

Policy documents may also cause the node which receives them to carry out an action specified in the policy.

As dictated by the DTD, a profile document consists of two sections, each of which has a complex logical structure.

The first section 100 refers to the creator of the policy and includes fields which indicate the level of authority enjoyed by the creator of the policy (some computing devices may be programmed not to take account of policies generated by a creator who has a level of authority below a predetermined level), the unique name of the policy, the name of any policy it is to replace, times at which the policy is to be applied etc.

The second section 102 refers to the individual computing devices or classes of computing devices to which the policy is applicable, and sets out the applicable policy 104 for each of those individual computing devices or classes of computing devices.

Each policy comprises a set of 'conditions' 106 and an action 108 which is to be carried out if all those 'conditions' are met. The conditions are in fact values of various fields, e.g. processing power (represented here as 'BogoMIPS'—a term used in Linux operating systems to mean Bogus Machine Instructions Per Second) and free memory. It will be seen that many of the conditions correspond to fields found in a profile document.

An example of an XML document created in accordance with the DTD shown in FIG. 3 is given below.

```
<?xml version = "1.0" encoding = "UTF-8"?>
<policy xmlns:xsi = "http://www.w3.org/2001/XMLSchema-instance"
xsi:noNamespaceSchemaLocation = "base_policy.xsd">
    <creator>
        <authority>
            <admin-domain >ferdina </admin-domain>
            <role>administrator</role>
        </authority>
        <identity>Antonio Di Ferdinando </identity>
        <reply-address>ferdina@drake.bt.co.uk </reply-address>
    </creator>
    <info>
        <unique-name>myPolicy </unique-name>
        <description>policy di prova </description>
        <priority>normal </priority>
        <start-date>2001.12.1 2</start-date>
        <expiry-date>2002.01.31 </expiry-date>
<replaces/>
</info>
<sender>
</sender>
<subject>
    <!- -domain or subject list- ->
    <!- -<domain>
        <domainName >futures.bt.co.uk </domainName>
    </domain>- ->
    <subject-list>
        <subjects>
            <host>132.146.107.218</host >
```

-continued

```
<conditions>
    <action >join </action>
    <conditionSet>
                    <SWConditions>
        <OSVer>2.4.16</OSVer>
        <OSArch>Linux </OSArch>
    </SWConditions>
    <HWConditions>
        <CPU>
            <number>2</number>
            <model>Pentium !III </model>
        </CPU>
        <HD>
            <HDTotal>112000K</HDTotal>
        <HD>
    </HWConditions>
    <otherConditions>
        <maxNeighbours>3</maxNeighbours>
    </otherConditions>
    </conditionSet>
</conditions>
</subjects>
<subjects>
    <host>132.146.107.219</host>
    <conditions>
        <action>join <faction>
        <condition Set>
            <otherConditions>
                <maxNeighbours>3 </maxNeighbours>
            </otherConditions>
        </conditionSet>
    </conditions>
</subjects>
</subject-list>
</subject>
</policy>
```

Figure 4:
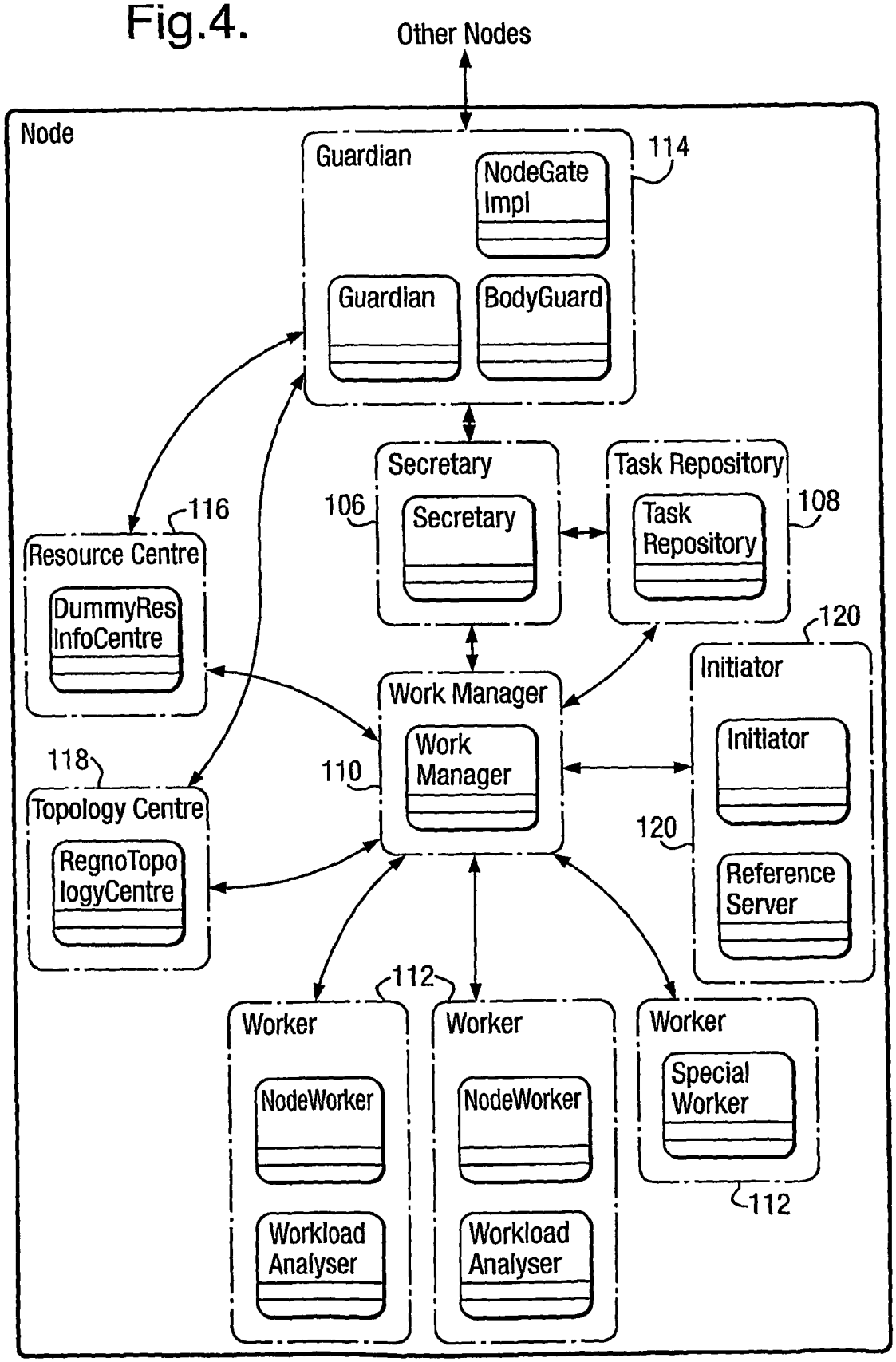
FIG. 4 shows the architecture of a software program installed on the computing devices of FIG. 1.

FIG. 4 shows the architecture of a software program recorded on the compact disc 16 and installed and executing on each of the computing devices (218-225) of FIG. 1. The software program is written in the Java programming language and thus consists of a number of 'class' files which contain bytecode which is interpretable by the Java Virtual Machine software on each of the computing devices. The classes and the interactions between them are shown in FIG. 4—the classes are grouped into modules (as indicated by the dashed-line boxes).

Much of the above program is explained in Bubak M, Plaszczak P, "Hydra—Decentralized And Adaptative Approach To Distributed Computing", Applied Parallel Computing, New Paradigms for HPC in Industry and Academia, 5th International Workshop, PARA 2000, 18-20 Jun. 2000, Springer-Verlag pp 242-9. The salient features of the classes are given below together with a full description of the additions and alterations made in order to implement the present embodiment.

As explained in that paper, the purpose of the software is to allow a task to shared amongst a plurality of computing devices. A user must provide a sub-class of a predetermined SimpleTask or CompositeTask abstract class in order to specify the task that he or she wishes to be carried out by the devices (218-225) included within the internetwork.

Whenever a new task arrives at the computing device running the program, the Secretary module 106 handles its reception and stores it using the Task Repository 108 module until the task is carried out as explained below.

The Work Manager module 110 causes a task to be carried out if a task arrives at the computing device and the computing device has sufficient resources to carry out that task. Each task results in the starting of a new execution thread 112 which carries out the task or, in insufficient resources are available at the device, delegates some or all of the class to one of a selected subset (218-220, 225) of computing devices (218-225) which form a task group suitable for carrying out the task. The manner in which the task group (218-220, 225) is assembled will be explained below.

The Guardian module 114 provides the interface to the other computing devices in the internetwork (FIG. 1). It implements the communications protocols used by the system and also acts as a security firewall, only accepting objects which have come from an authorised source. The Guardian module uses Remote Method Invocation to communicate with other computing devices in the internetwork (FIG. 1). More precisely, the NodeGateImpl object encapsulates the RMI technology and implements the remote interface called NodeGate.

The Topology Centre module 118 maintains a remote graph data structure—a graph in this sense being a network comprising a plurality of nodes connected to one another via links. Each of the computing devices which is a member of the task group (218-220, 225) is represented by an RMI remote object in the remote graph data structure. When computing devices connect to or are disconnected from the computing device network, this is requested using RMI and results in the computing devices updating their remote graph data structures accordingly.

Lastly, the Initiator module comprises two objects. One, the Initiator object, initiates the computing device. The other, the ReferenceServer object, maintains the references to the created modules.

Each of the computing devices (218-225) also stores a launch script. The processes carried out by each computing device on execution of that script are illustrated in FIG. 5.

Figure 5:
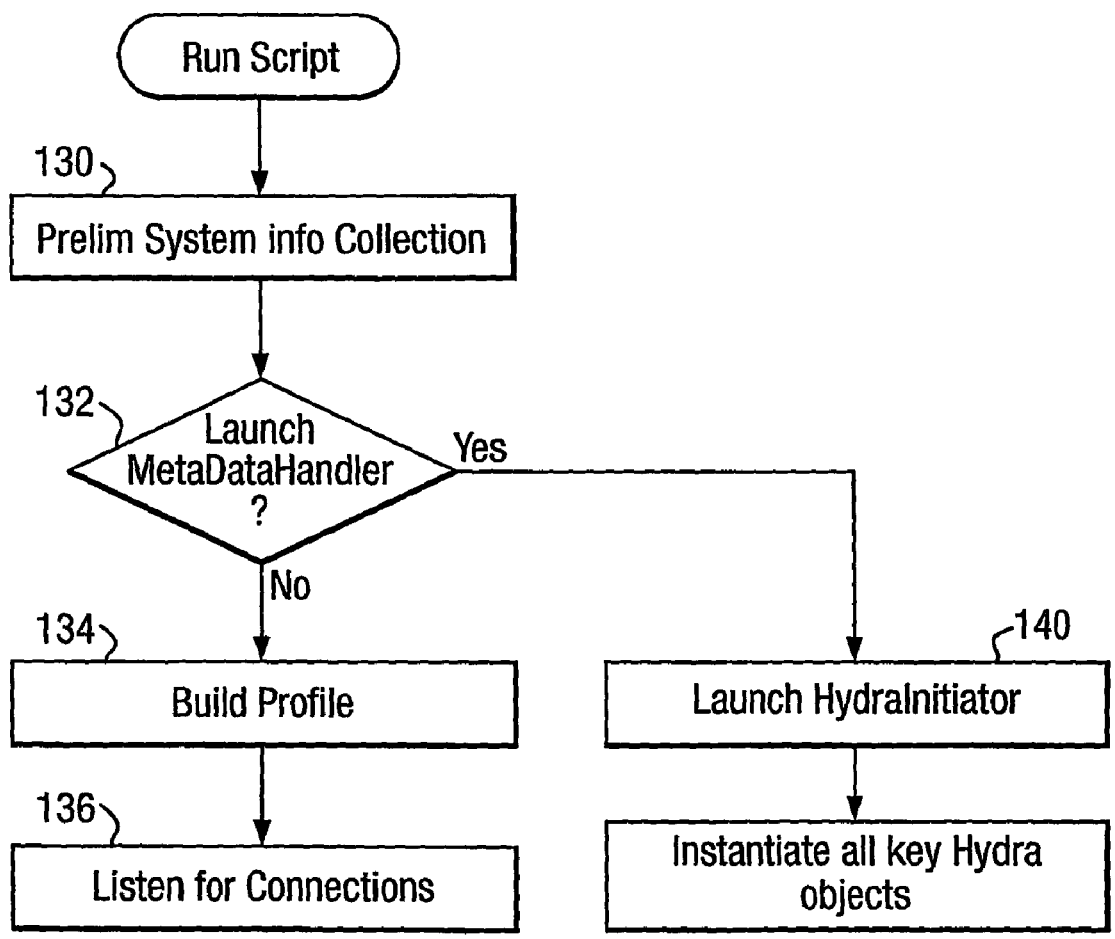

Turning to FIG. 5, the first stage (step 130) is the collection of information about the capabilities of the computing device on which the script is run. This involves the transfer of:
a) information (available from the Linux operating system program) about the total and used amount of permanent memory to a permanent memory information file;
b) information (available from the Linux operating system program) about the amount of volatile memory present (RAM and swap) to a volatile memory information file;
c) information (available from the operating system program) about the Central Processing Unit (CPU) to a CPU information file;
d) information (available from the operating system program) about the latency experienced in communicating another computing device specified by the user in the script to a link information file; and
e) information (available from the operating system program) about the average load experienced by the processor of the computing device to a utilisation information file.

Thereafter, in step 132, a MetaDataHandler execution thread is started together with another execution thread (step 140) which runs the Initiator class (FIG. 4: 120). The MetaDataHandler execution thread starts by generating 132 a profile XML document in accordance the DTD seen in FIG. 2.

Many of the fields of the profile document are to be found in the files created at the time of the preliminary system information collection step (step 130) as follows:
a) the OS Version field of the general information section 20 can be filled with a value taken from the system properties available from the operating system;
b) all of the fields of the JVM section 22 can be filled from the system properties available from the operating system;
c) the processor speed field of the CPU section 24 can be found from the CPU information file saved in the preliminary system information collection step (step 130);

d) all of the fields of the volatile memory section 26 can be found from the volatile memory information file saved in the preliminary system information collection step (step 130);
e) all of the fields of the link section 26 can be found from the link information file saved in the preliminary system information collection step (step 130);
f) all of the fields of the utilisation section 26 can be found from the utilisation information file saved in the preliminary system information collection step (step 130); and
g) all of the fields of the permanent memory section 26 can be found from the permanent memory information file saved in the preliminary system information collection step (step 130).

The remaining entries in the profile by utility software which forms part of the MetaDataHandler thread.

The MetaDataHandler thread then opens a socket on port 1240 and listens for connections from other computing devices. The action taken in response to receiving a file via that socket will be explained below with reference to FIGS. 7 and 8.

Figure 6:
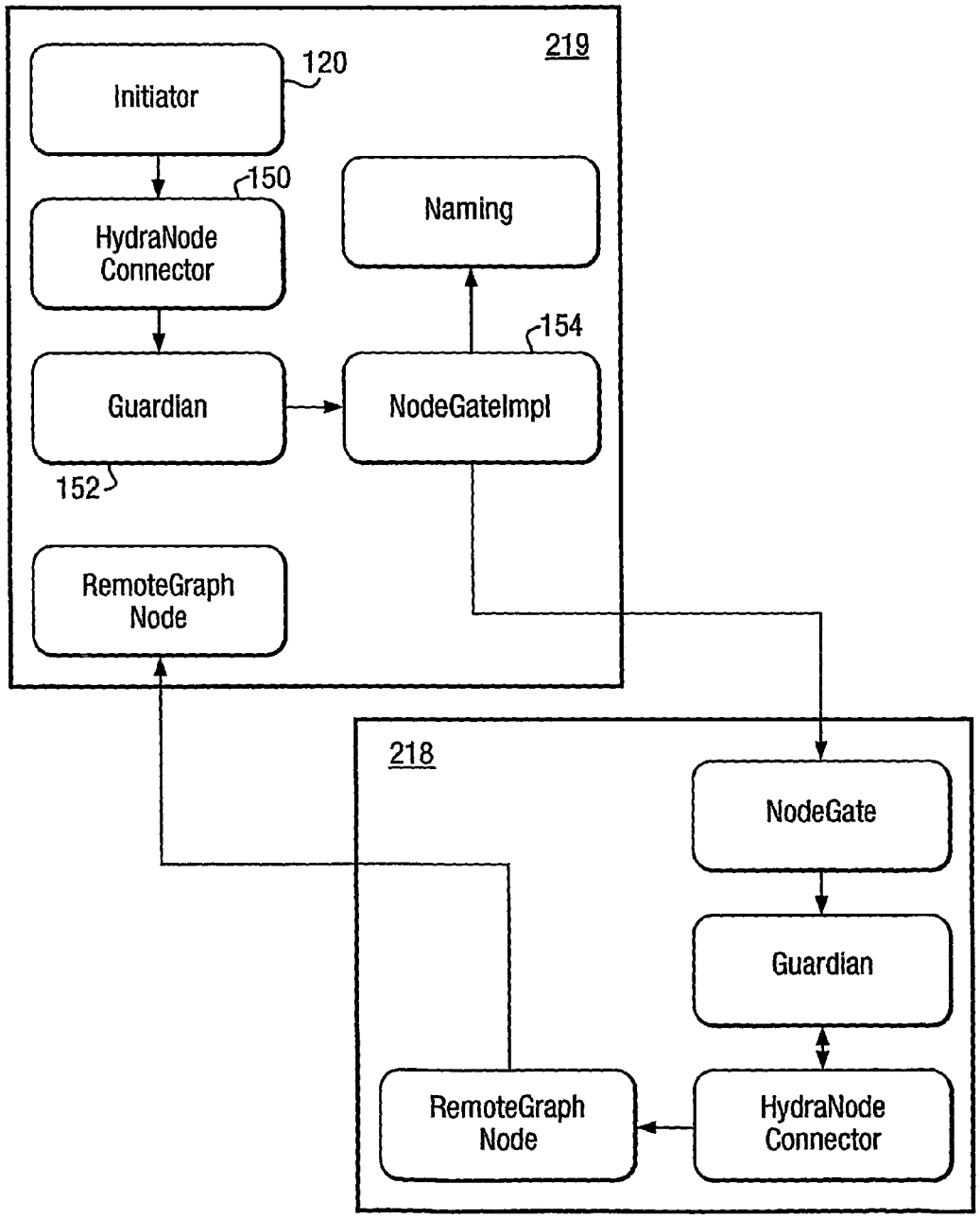
FIG. 6 shows how a node connects to a distributed computing network set up within the physical network of FIG. 1.

The part of the script which launches the Initiator class may include the RMI name of a computing device to connect to (it will not if the computing device concerned is the first node in the task group). If it does, then the Initiator class results in an attempt to connect to that node. An example will now be explained with reference to FIG. 6.

A script including a reference to the server 218 is run on the PC 219. As explained above, this results in the Initiator class 120 being run on the PC 219. This in turn requests HydraNodeConnector 150 to connect to the server 218 (HydraNodeConnector is an interface for connection decision making, implemented by RegnoTopologyCentre 118). HydraNodeConnector decides to fulfil the request and sends it to Guardian 152, which passes it to NodeGateImpl 154. As mentioned above, NodeGateImpl encapsulates RMI technology. NodeGateImpl 154 uses Naming class (a standard RMI facility) to obtain a reference to NodeGate of the server 218 (NodeGate is the node remote interface seen by other nodes, normally implemented by NodeGateImpi). As soon as it has the reference, NodeGateImpl 154 requests NodeGate of the server 218 to connect. The request contains the remote reference to RemoteGraphNode of the PC 219 and the XML profile document representing the capabilities of the PC 219.

When received at the server 218, the request is passed to the Guardian and then to the HydraNodeConnector. As explained below, the MetaDataHandler thread determines whether the request to connect to the distributed computing network should be accepted and informs HydraNodeConnector accordingly. In the present case, the connection is accepted. Hence, HydraNodeConnector supplies the local RemoteGraphNode with a reference to its counterpart on the PC 219 and orders the RemoteGraphNode to establish a connection. The server 218 and the PC 219 exchange references and link to each other using their internal connection mechanisms.

The task group topology databases in the server 218 and the PC 219 are then updated accordingly.

Figure 7:
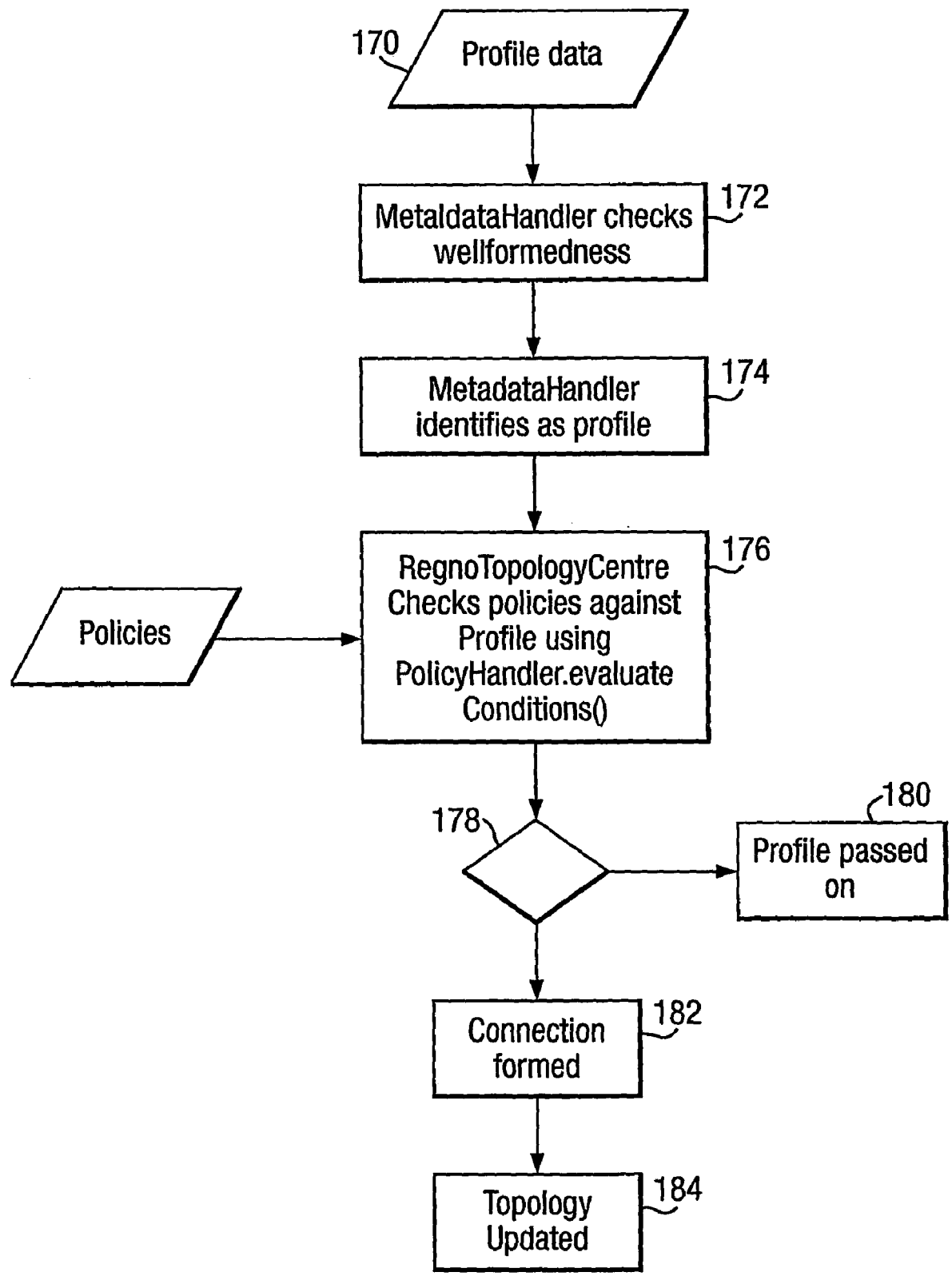
FIG. 7 is a flow-chart showing how each of the computing devices of FIG. 1 responds to a request by another computer to join a task group of computing devices for performing a distributed process.

The response of a computing device running the MetaDataHandler execution thread to receipt of a profile XML document will now be explained with reference to FIG. 7.

On receiving a profile file (step 170), the MetaDataHandler checks that the XML document is well-formed—a concept which will be understood by those skilled in the art (step 172). This check is carried out by an XML parser—in the present case the Xerces XML parser available from the Apache Software Foundation is used. Thereafter, in step 174, the MetaDataHandler recognises the input file as a profile which results in the use of an evaluateConditions method of a PolicyHandler class to check the profile against any policies stored in the computing device which has received the profile document.

This involves a comparision of the values stored in the profile which those stored in the policy. The nature of that comparison (i.e. whether, for example, the value in the profile must be equal to the value in the policy or can also be greater than) is programmed into the PolicyHandler class. To give an example, the policy example given above includes a value of 112000K between <HD> tags. The profile example given above has two sets of data relating to permanent memory, one for each of two hard discs. The second set of data is:
   <HDTotal>16496</HDTotal>
   <RDUsed>12007</HDUsed>

In this case, the PolicyHandler class is programmed to calculate the amount of free hard disc space (i.e. 4489K) and will refuse connection since that amount is not greater than or equal to the required 112000K of permanent storage.

In step 178, it is determined whether all the required conditions are met. If they are the connection is formed (step 180) and the task group topology data is updated (step 182) as described above. If one or more of the conditions is not met then the profile is forwarded to another node in the internetwork (step 184).

Figure 8:
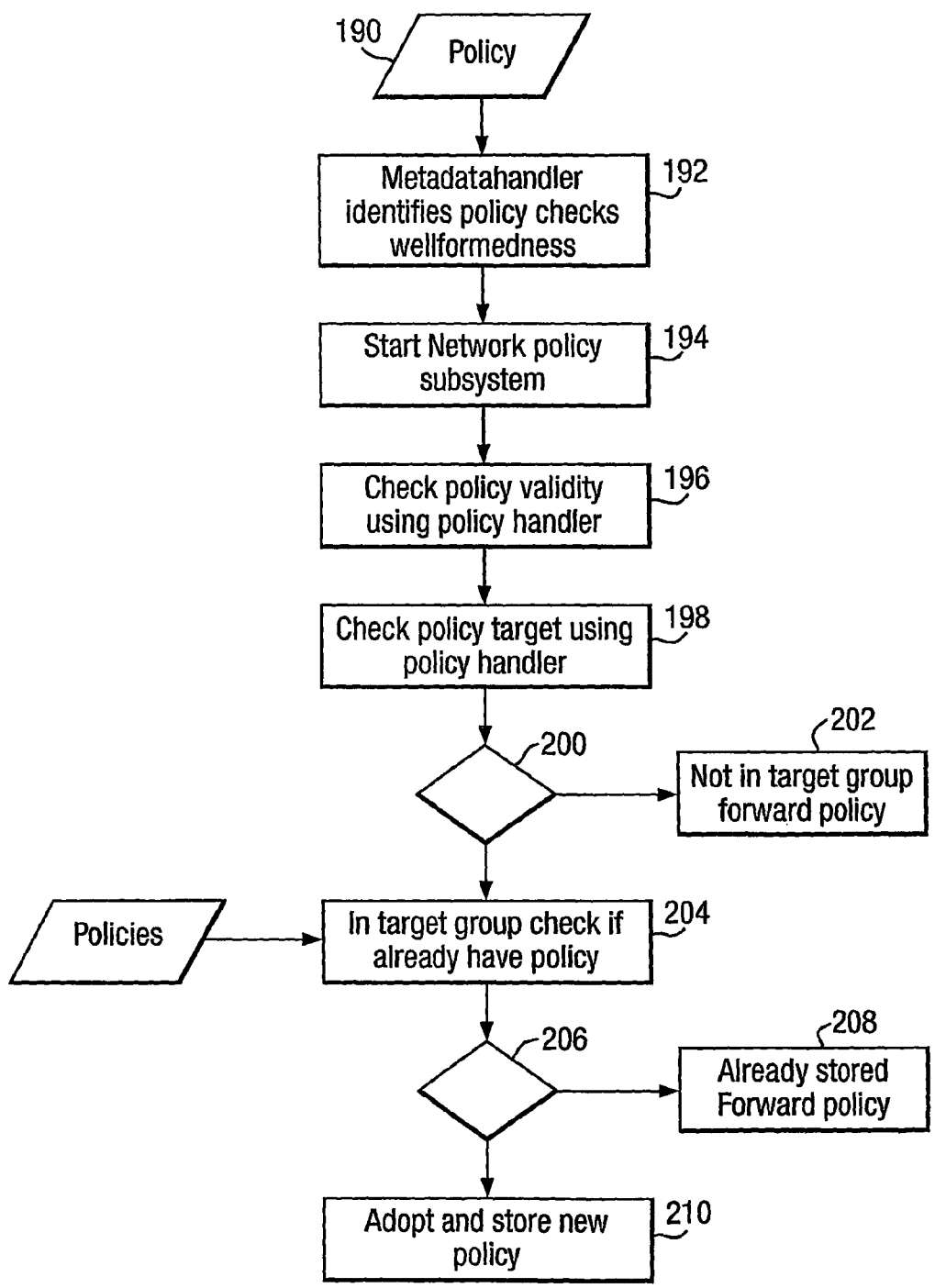
FIG. 8 is a flow-chart showing how each of the computing devices of FIG. 1 responds to a received policy document.

If, on the other hand, the file received on the port associated with the MetaDataHandler execution thread is a policy, then the processing shown in FIG. 8 takes place.

The first step is identical to that carried out in relation to the receipt of a profile file. After receipt (step 190), the file is checked (step 192) to see whether it is well-formed. Thereafter, the policy file is validated by checking it against the structure defined in the relevant DTD. As will be understood by those skilled in the art, the DTD may be incorporated directly in the policy file, or it can be a separate file which is referenced in an XML DOCTYPE declaration as a Universal Resource Identifier (URI). The policy document therefore includes information on the location of the DTD to use—normally, the DTD will be stored at an accessible web server. Thereafter, the Network Policy subsystem is started (step 194). This then causes a check to be carried out to see whether the policy uses the correct date system and has sensible values for parameters (step 196). The computing device receiving the policy then extracts the domain and/or subject-list within the policy document (step 198). A test (step 200) is then carried out to see whether the receiving computing device is within a domain to which the policy applies or is included in a list of subjects to which the policy applies.

If the computing device is not in the target group then it forwards the policy to its neighbours which are yet to receive the policy (step 202). This forwarding step is carried out in accordance with the so-called echo pattern explained in Koon-Seng Lim and Rolf Stadler, 'Developing pattern-based management programs', Center for Telecommunications Research and Department of Electrical Engineering, Columbia University, New York, CTR Technical Report 503-01-01, Aug. 6, 2001. The physical topology information 34 found in the profile is used as an input to this step.

If the computing device is within the target group then it checks whether if already has the policy (steps 204 and 206). If the policy is already stored, then it is just forwarded (step 208) as explained in relation to step 202 above. Alternatively, the current policy can be overwritten, thus providing a mechanism for updating a policy.

If the policy is not already stored, then it is stored (step 210). Copies of the policy are then forwarded as explained above. It is to be noted that the policy may specify that the node receiving the policy is to re-send its profile to the node to which it initially connected. If this is combined with a replacement of the policy adopted by the node to which it initially connected, repeating the joining steps explained above will re-configure the distributed computing network in accordance with the replacement policy.

Figure 9:
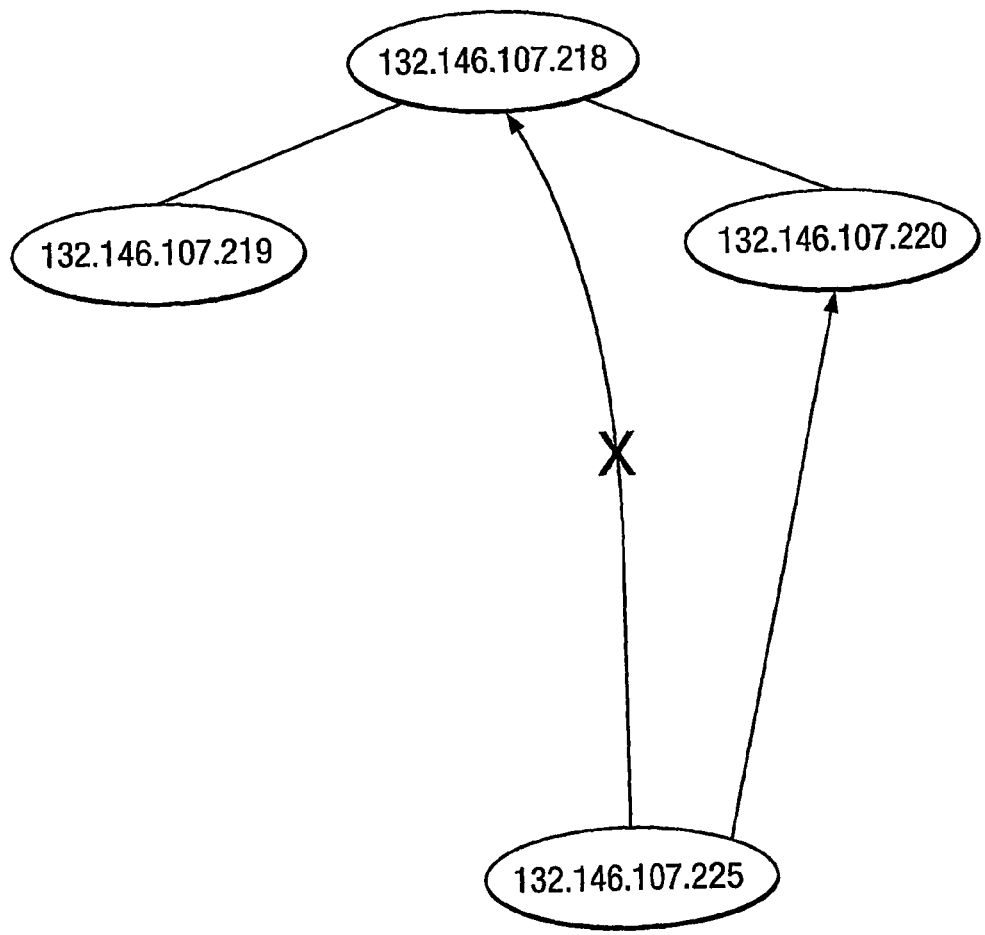
FIG. 9 illustrates how the topology of the task group is controlled by the policy documents stored in the computing devices of FIG. 1.

An example of the operation of the above embodiment will now be explained with reference to FIG. 9. In that diagram, the ellipses refer to computing devices in FIG. 1, and are represented by IP addresses, the last three digits of which correspond to the reference numerals used in FIG. 1.

The adminstrator of the internetwork of FIG. 1 might wish to use spare computing power around the internetwork to carry out a complex computational task. To do this using the above embodiment, the administrator writes a policy which includes a first portion applicable to the domain including all computing devices having an IP address 132.146.107.xxx (say), which portion includes a first condition that the utilisation measured over the last 15 mins is less than 5% of processor cycles. The policy also includes a second portion which is applicable only to the server 218 and includes the additional condition that the processor speed is greater than 512 million instructions per second.

He supplies that policy to the server computer 218 and runs a script as explained above, but without specifying the IP address of a host to connect to. Thereafter, he amends the script to specify the server 218 as the device to connect to, makes the condition relating to processor speed less stringent, and copies the amended policy to each of the computing devices within the internetwork. He then runs the script in numerical order of host addresses (i.e. he runs it on personal computer 219 first, then personal computer 220 etc).

In this example, it is supposed that the resultant attempts to connect to the server 218 by the personal computer 221 and the laptop computers 223 and 224 fail because their utilisation is greater than 5%. As explained in relation to FIG. 7, those connection requests will then be forwarded to either the personal computer 219 or the personal computer 220 which will apply the same policy and similarly reject the connection request. A similar outcome will result from the requests being forwarded to personal computer 220.

However, the personal digital assistant might pass the utilisation test, but fail the test on processor speed. In this case, although the server 218 rejects the request, the personal computer 219 will accept the request.

It will be realised by those skilled in the art, that the resulting logical topology (which places the fastest processors closest to the centre of the task group) will result in better performance than had the personal digital assistant connected directly to the server 218. It will be seen how the generation of policies and profiles and comparison of the two prior to accepting a connection to a task group allows the automatic generation of a logical topology which suits the nature of the distributed task which is to be carried out. Thus, the same set of network nodes can be arranged into different distributed networks in dependence on policies which might reflect, for example, a requirement for large amounts of memory (e.g. in a file-sharing network), a requirement for low latency (e.g. in a multi-player gaming network), a requirement for stored energy to drive a radio transmitter (in an ad hoc wireless network) or a requirement for processing power (e.g. in a network performing a massive calculation).

Many variations on the above embodiment are possible. Some of the possible variations are listed below:

i) Although the above embodiment concerned a distributed computer comprising a plurality of interconnected computing devices having both persistent memory and a processor, other embodiments of the invention might comprise a plurality of processors sharing a common memory;

ii) the internetwork might be much larger than that illustrated in FIG. 1—for example, it might include other nodes connected to those shown in FIG. 1 via a wide area network;

iii) in the above-described embodiment, nodes applied to join the task group in response to the administrator running a script program on them. In alternative embodiments, a node already in the task group might ask its neighbours whether they have enough resources to meet the requirements of the policy for this task group. The comparison of the policy and the profile might take place in the applicant node, or in the responding node, or in a third party computer;

iv) in the above-described embodiment a logical network is created on the basis of a physical network as a precursor to distributing a computational task amongst the computers forming the nodes of that logical network. Similar techniques for generating a logical network based on a physical network might also be used in creating storage networks or ad hoc wireless networks based on a physical network topology. In those case, the task to be distributed would not be computation as such, but the storage of electronic data, or the forwarding of messages or packets across the network.

The invention claimed is:

1. A method of dividing a task amongst a plurality of nodes within a distributed computer, said method comprising:

operating each of said plurality of nodes, each of said nodes having recorded therein graph data representing a task-suited logical network comprising a plurality of nodes and the links between them, to receive immediate neighbour requirements data indicating desired properties of immediate neighbour nodes in a task-suited logical network of nodes and interconnections between them, which properties lead to said task-suited logical network being suited to said task or tasks of a similar type, said requirements data including distinctive immediate neighbour requirements data indicating desired immediate neighbour properties which differ from immediate neighbour properties for one or more other nodes;

receive node capability data from an applicant node available to join said task suited logical network;

determine whether to allow said applicant node to become an immediate neighbour in dependence upon said distinctive immediate neighbour requirements data and said node capability data; and update said stored graph data on deciding to grant a task-suited logical network connection request received from an applicant node, send a response to the applicant node sending said request indicating that said request was successful, and distribute said task amongst the plurality of nodes in accordance with the task-suited logical network topology thus determined.

2. A method according to claim 1 wherein said immediate neighbour requirements data comprises one or more property-value pairs.

3. A method according to claim 2 wherein said immediate neighbour requirements data is arranged in accordance with a predefined data structure defined by requirements format data stored in said computer, said method further comprising the step of verifying that said immediate neighbour requirements data is formatted in accordance with predefined data structure by comparing said immediate neighbour requirements data to said requirements format data.

4. A method according to claim 1 wherein said node capability data comprises one or more property-value pairs.

5. A method according to claim 4 wherein said node capability data is arranged in accordance with a predefined data structure defined by node capability format data stored in said computer, said method further comprising that said node capability data is formatted in accordance with predefined data structure by comparing said node capability data to said node capability format data.

6. A method according to claim 1 further comprising the step of operating a node seeking to join said task-suited logical network to generate node capability data and send said data to one or more nodes already included within said task-suited logical network.

7. A method according to claim 1 wherein said task distribution involves a node forwarding a task to a node which neighbours it in said task-suited logical network topology.

8. A method according to claim 1 wherein said immediate neighbour requirements data comprises data relating to the amount of data storage or processing power available at said node.

9. A method according to claim 1 wherein said immediate neighbour requirements data comprises data relating to the quality of communication between said node and one or more nodes already selected for said task-suited logical network.

10. Distributed computer apparatus comprising:
   a plurality of data processor nodes, each connected to at least one other of said data processor nodes via a communications link;
   each of said nodes having recorded therein:
      a) task-suited logical network membership policy data, said logical network membership policy data including distinctive immediate neighbour requirements data indicating desired immediate neighbour properties which differ from immediate neighbour properties for one or more other nodes;
      b) graph data representing a task-suited logical network comprising a plurality of nodes and the links between them; and
      c) processor readable code executable to update said graph data, said code comprising:
      task-suited logical network membership request generation code executable to generate and send a task-suited logical network membership request including node profile data to another node indicated to be a member of said task-suited logical network;
      task-suited logical network membership request handling code executable to receive a task-suited logical network connection request including node profile data, and decide whether said request is to be granted in dependence upon the task-suited logical network distinctive immediate neighbour requirements data stored at each of said nodes; and
      task-suited logical network membership update code executable to update said stored graph data on deciding to grant a task-suited logical network connection request received from an applicant node, and to send a response to the applicant node sending said request indicating that said request is successful.

11. Distributed computer apparatus according to claim 10, wherein each node further has recorded therein node profile data generation code executable to generate said node profile data.

12. Distributed computer apparatus according to claim 10 or claim 11, wherein each node further has recorded therein task-suited logical network policy data distribution code executable to distribute said policy data, said policy distribution code comprising:
   policy input code operable to receive policy data;
   policy storage code operable to store said received policy data at said node; and
   policy forwarding code operable forward said policy from said node to at least one other node in said distributed computer apparatus.

13. Distributed computer apparatus according to claim 10, wherein each node further has recorded therein policy format data; and policy data format verification code executable to check that said received policy data accords with said policy format data.

14. Distributed computer apparatus according to claim 10, wherein each node further has recorded therein profile format data; and profile data format verification code executable to check that said received node profile data accords with said profile format data.

15. Distributed computer apparatus according to claim 10, wherein each node further has recorded therein received program data execution code executable to receive program data from another of said nodes and to execute said program.

16. Distributed computer apparatus according to claim 15, wherein said plurality of processor nodes comprise computers executing different operating systems programs, and said received program execution code is further executable to provide a similar execution environment on nodes despite the differences in said operating system programs.

17. A method of operating a member node of a distributed computing network, said method comprising:
   accessing task-suited logical network connection policy data including distinctive immediate neighbour requirements data comprising one or more property-value pairs indicating one or more criteria for becoming an immediate neighbour of said member node in a task-suited logical network built on said distributed computing network, said node having recorded therein graph data representing a task-suited logical network comprising a plurality of nodes and the links between them;
   receiving, from an applicant node, profile data comprising one or more property-value pairs indicating characteristics of the applicant node;
   determining whether said applicant profile data indicates that said applicant node meets said connection criteria for becoming an immediate neighbour of said node in said task-suited logical network; and
   responsive to said determination indicating that said applicant node meets said connection criteria, updating task-suited logical network membership data accessible to said node to indicate that said applicant node is an immediate neighbour of said member in said task-suited logical network, including updating said stored graph data on deciding to grant a task-suited logical network connection request received from an applicant node, and sending a response to the applicant node sending said request indicating that said request was successful.

18. A method according to claim 17 wherein said member node stores graph data representing a task-suited logical network comprising a plurality of nodes and the links between them.

19. A method according to claim 18 wherein said member node stores said task-suited logical network connection policy data.

20. A method according to claim 19 further comprising the steps of:

updating task-suited logical network connection policy data;

removing indications that one or more nodes are members of said task-suited logical network from said graph data; and sending an indication to said one or more nodes requesting them to re-send said profile data.

21. A computer storage containing a computer program product loadable into a memory of a digital computer at a node of a plurality of nodes in a distributed computing network and executable by the digital computer, wherein the computer program comprises:

task-suited logical network immediate neighbour requirements data reception code to receive and store received task-suited logical network immediate neighbour requirements data, wherein said requirements data includes distinctive immediate neighbour requirements data indicating desired immediate neighbour properties which differ from immediate neighbour properties for one or more other nodes, each of said nodes having recorded therein graph data representing a task suited logical network comprising a plurality of nodes and the links between them;

node capability profile data reception code to receive and store received node capability profile data;

comparison code to compare said node capability data and said distinctive immediate neighbour requirements data to find whether the node represented by said node capability data meets said distinctive immediate neighbour requirements data;

task-suited logical network topology update code to add an identifier of said represented node to a task-suited logical network topology data structure on said comparison code indicating that said represented node meets said requirements; and task execution code to update said stored graph data on deciding to grant a task-suited logical network connection request received from an applicant node, to send a response to the applicant node sending said request indicating that said request was successful, to receive code from another node in said task-suited logical network and to execute said code or forward said code to a node represented as an immediate neighbour in said task-suited logical network topology data structure.

22. A method of operating a plurality of nodes in a distributed network to create a logical network topology based on the physical topology of said network, said logical network topology being suited to a task, said method comprising:

identifying a member node as a member of said task-suited logical network, each of said nodes having recorded therein graph data representing a task-suited logical network comprising a plurality of nodes and the links between them;

storing immediate neighbour requirements data including distinctive immediate neighbour requirements data representing what is required of nodes in order for them to be a suitable immediate neighbour of said member node in said task-suited logical network;

storing candidate neighbour node capability data representing the capabilities of a candidate neighbour node in said physical network;

operating said network to compare said candidate neighbour node capability data with said distinctive immediate neighbour requirements data of the node of which the candidate neighbour node seeks to be an immediate neighbour; and responsive to said comparison indicating that said candidate neighbour node meets said requirements, making said candidate node an immediate neighbour in said logical network, and updating said stored graph data on deciding to grant a task-suited logical network connection request received from said candidate node, and sending a response to the candidate node sending said request indicating that said request was successful.

* * * * *